(12) United States Patent
Kim

(10) Patent No.: US 10,004,328 B2
(45) Date of Patent: Jun. 26, 2018

(54) MOVABLE TABLE

(71) Applicant: ROBOTIS, INC., Lake Forest, CA (US)

(72) Inventor: Byoung Soo Kim, Seoul (KR)

(73) Assignee: ROBOTIS, INC., Lake Forest, CA (US)

( * ) Notice: Subject to any disclaimer, the term of this patent is extended or adjusted under 35 U.S.C. 154(b) by 0 days. days.

(21) Appl. No.: 15/299,462

(22) Filed: Oct. 21, 2016

(65) Prior Publication Data

US 2018/0110326 A1   Apr. 26, 2018

(51) Int. Cl.
| | | |
|---|---|---|
| *A47B 21/03* | (2006.01) | |
| *A47B 9/00* | (2006.01) | |
| *A47B 13/08* | (2006.01) | |
| *A47B 13/02* | (2006.01) | |
| *A47B 31/00* | (2006.01) | |
| *A47B 37/02* | (2006.01) | |
| *A47B 21/02* | (2006.01) | |
| *A47B 21/06* | (2006.01) | |
| *H02J 7/00* | (2006.01) | |

(52) U.S. Cl.
CPC ............ *A47B 21/0314* (2013.01); *A47B 9/00* (2013.01); *A47B 13/02* (2013.01); *A47B 13/081* (2013.01); *A47B 21/02* (2013.01); *A47B 21/06* (2013.01); *A47B 31/00* (2013.01); *A47B 37/02* (2013.01); *H02J 7/0042* (2013.01); *A47B 2021/066* (2013.01); *A47B 2031/003* (2013.01); *A47B 2200/008* (2013.01); *A47B 2200/0066* (2013.01)

(58) Field of Classification Search
CPC .................. A47F 5/025; A47B 49/008; A47B 2200/0056; A47B 2200/0066; A47B 2200/008; A47B 21/00; A47B 2021/0076
USPC .................................. 108/50.01, 50.02, 7, 20
See application file for complete search history.

(56) References Cited

U.S. PATENT DOCUMENTS

| | | | | |
|---|---|---|---|---|
| 5,174,223 A | * | 12/1992 | Nagy ..................... | A47B 21/00 108/50.01 |
| 5,450,800 A | * | 9/1995 | Leonard ............. | A47B 21/0073 108/7 |
| 5,671,091 A | * | 9/1997 | Monroe ............... | G02B 27/022 108/10 |
| 5,806,943 A | * | 9/1998 | Dell ....................... | A47B 21/00 108/147 |
| 6,095,476 A | * | 8/2000 | Mathis ................... | F16M 11/10 108/7 |
| D446,208 S | * | 8/2001 | Zachl .......................... | D14/302 |
| 6,352,037 B1 | * | 3/2002 | Doyle ..................... | A47B 9/00 108/147 |
| 6,493,217 B1 | * | 12/2002 | Jenkins, Jr. ............ | A47B 21/00 108/147 |

(Continued)

*Primary Examiner* — Jose V Chen
(74) *Attorney, Agent, or Firm* — Revolution IP, PLLC

(57) ABSTRACT

A movable table comprises a main body part having a table and a receiving unit; a moving part provided at a lower end of the main body part; a power supply part provided at one surface of the main body part and having a power supply unit for charging or connection to power; and an image device part provided at an upper end of the main body part so that a position or an angle thereof is adjusted and having an image unit, wherein one or more of the moving part, the power supply part and the image device part are formed as modules which are removably attached to the main body part.

9 Claims, 5 Drawing Sheets

(56) References Cited

U.S. PATENT DOCUMENTS

| | | | | |
|---|---|---|---|---|
| 6,493,220 B1* | 12/2002 | Clark | | A47B 21/00 248/918 |
| 6,550,401 B2* | 4/2003 | Chiba | | B23Q 1/25 108/20 |
| 6,663,569 B1* | 12/2003 | Wilkins | | A61B 8/00 600/459 |
| 8,616,136 B2* | 12/2013 | Burgess | | F16M 11/046 108/50.02 |
| 8,631,747 B2* | 1/2014 | Woo | | A61B 8/00 108/147 |
| 8,789,474 B2* | 7/2014 | Kim | | A47B 41/02 100/138 |
| 8,947,215 B2* | 2/2015 | Mandel | | G06Q 10/109 108/147 |
| 9,345,318 B2* | 5/2016 | Kollreider | | A47B 9/04 |
| 9,655,438 B1* | 5/2017 | Shoenfeld | | A47B 21/02 |
| 2006/0137577 A1* | 6/2006 | Chang | | A61B 5/00 108/7 |
| 2007/0001413 A1* | 1/2007 | Rossini | | A47B 21/00 280/47.35 |
| 2007/0227409 A1* | 10/2007 | Chu | | A47B 21/00 108/50.02 |
| 2007/0228680 A1* | 10/2007 | Reppert | | A47B 21/00 280/47.35 |
| 2008/0001043 A1* | 1/2008 | Meyer | | A47B 21/00 248/129 |
| 2009/0012634 A1* | 1/2009 | Koch | | A47B 9/00 700/90 |
| 2010/0213679 A1* | 8/2010 | Smith | | A47B 21/00 280/47.35 |
| 2013/0199420 A1* | 8/2013 | Hjelm | | A47B 21/00 108/20 |

* cited by examiner

MOVABLE TABLE

BACKGROUND

The present invention relates to a movable table, and more particularly, to a movable table which is connectable to a smart device or an image device to drive it and movable by itself or a user command and to which a human-machine interface is provided.

Recently, robots which can interact with a user have received a lot of attention. A fair number of robots are formed in the form of humanoids which are concentrated on having various functions for copying human appearances or motions. Also, a larger number of emotional robots which are formed in the form of puppies or pet dogs are commercialized. These conventional robots characterized by interacting with human beings may be recognized as independent individuals or may provide amusements through conversations with users.

However, since these conventional robots are based on an attribute or philosophy of existing as independent individuals which are not human beings, they are concentrated on having human or pet's appearances. Accordingly, there is a tendency that it is not taken account of convenience when a man who develops and uses a robot accesses the robot or performs a certain motion like the robot. That is, the conventional robot is not adapted for user convenience.

Therefore, it is necessary to develop a new robot or structure extending beyond a concept of the conventional robot in consideration of user convenience or accessibility when an interaction with the user occurs.

To this end, it is required to develop a movable table which is formed in a table shape used as a worktable or using an image device, introduces an interaction concept of a robot to be movable and has an interface which can interact with the user.

Meanwhile, in a human-machine interface, an importance of a smart device is recently emphasized. The smart device is not designed only for the interaction with human beings but needs various other additional functions. In particular, the smart device may be connected to the Internet, may obtain intelligence and information through on-line and may perform various functions through various apps (applications). There is limitation in expressing such functions and interactions through only a screen and a sound using an output device built in the smart device, and thus various additional output devices are required. Therefore, even in a movable table which can interact with the user, it is necessary to use functions of the smart device.

SUMMARY

The present invention is directed to a movable table which is formed in a table shape and also interacts with a user. Also, the present invention is directed to a movable table which is connected to a smart device or an image device to drive it. Also, the present invention is directed to a movable table which is movable by itself or a user command and to which a human-machine interface is provided.

However, technical problems to be solved are not limited thereto, and other technical problems may be understood by one of ordinary skill in the art from the following embodiments.

According to an aspect of the present invention, there is provided a movable table including a main body part having a table and a receiving unit; a moving part provided at a lower end of the main body part; a power supply part provided at one surface of the main body part and having a power supply unit for charging or connection to power; and an image device part provided at an upper end of the main body part so that a position or an angle thereof is adjusted and having an image unit, wherein one or more of the moving part, the power supply part and the image device part are formed as modules which are removably attached to the main body part.

The movable table may further include a control part which is electrically connected to the moving part, the power supply part and the image device part to control an operation thereof.

The table may be slidably connected to one surface of the main body part and may have a height adjusting unit.

The receiving unit may be provided inside the main body part in a drawer type.

The moving part may have a plurality of wheels having a fixing unit installed thereat.

The movable table may further include a motion part provided at a side surface of the main body part and having a first driving unit.

The first driving unit may include an actuator, and the motion part may be relatively moved or rotated with respect to the main body part by the first driving unit and may perform a predetermined motion.

The image unit may include one or more of a smart device, a monitor, a display device, an imaging device and a lighting device.

The image device part may include a cradle on which the image unit is put, and a supporter provided between the cradle and the main body part to support the cradle and having a second driving unit which adjusts a position or an angle of the cradle.

The movable table may further include a sensor part which is provided at one or more of the main body part, the power supply part and the image device part and detects an operation state of the movable table or a environmental state therearound.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
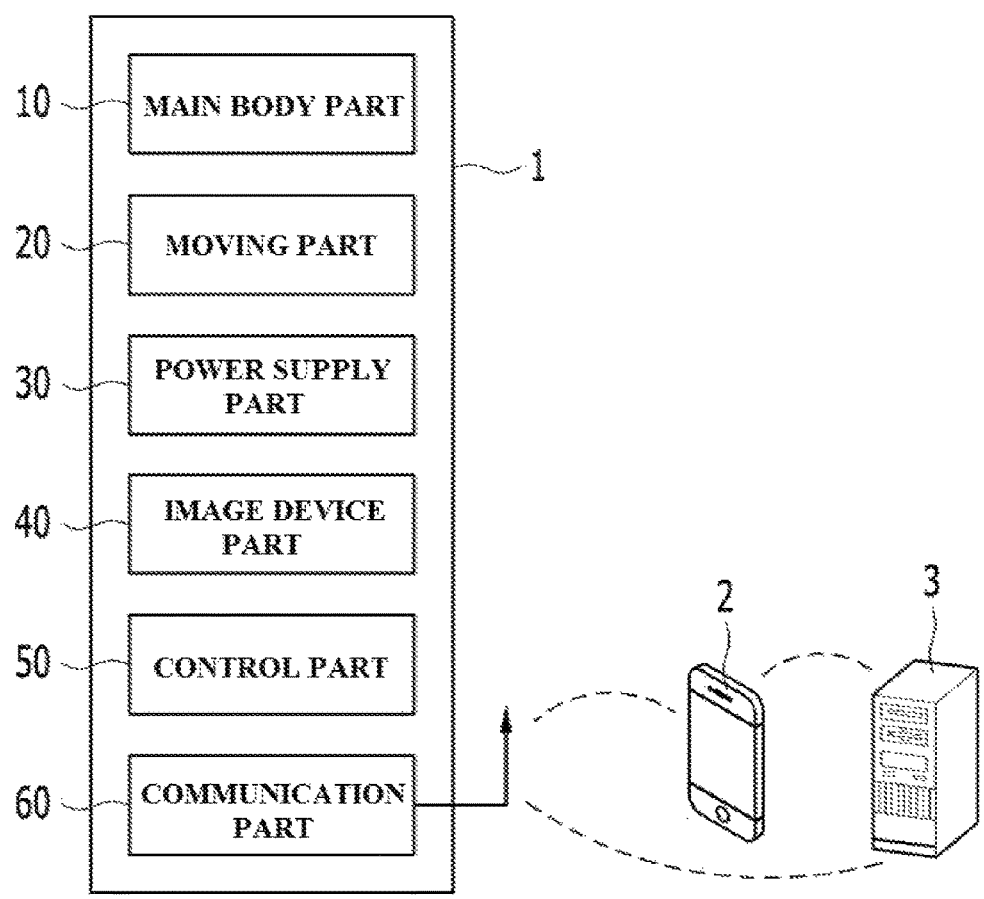
FIG. 1 is a schematic block diagram of a movable table according to an embodiment of the present invention.

Exemplary embodiments of the present invention will be described in detail below with reference to the accompanying drawings. However, the present invention may be embodied in different forms and should not be construed as limited to the embodiments set forth herein. And in the drawings, explanatorily irrelevant portions are omitted to clearly describe the present invention, and the same components are designated by the same reference numerals throughout the specification.

It is to be noted that, in this specification, when a certain component is said to be connected (in contact with and coupled) to another component, the certain component may be directly connected to the other component, or a third component may be interposed therebetween. Also, when it is described that a certain portion includes a certain component, this means that another component is not excluded, but the portion may further include another component, as long as an opposite description is not specifically made.

The terms used herein are merely to describe a specific embodiment, and do not limit the present invention. Further, unless the context clearly indicates otherwise, singular expressions should be interpreted to include plural expressions. It is understood that terms "comprises," "comprising," "includes" or "has" are intended to indicate the presence of features, numerals, steps, operations, elements and components described in the specification or the presence of combinations of these, and do not preclude the presence of one or more other features, numerals, steps, operations, elements and components, the presence of combinations of these, or additional possibilities.

Hereinafter, the exemplary embodiments of the present invention will be described in detail below with reference to the accompanying drawings.

FIG. 1 is a schematic block diagram of a movable table according to an embodiment of the present invention. As illustrated in the drawing, a movable table 1 includes a main body part 10, a moving part 20, a power supply part 30 and an image device part 40. Also, the movable table 1 may further include a control part 50 or a communication part 60 and may additionally include other elements provided at a robot, an actuator and a table.

In the present invention, the robot is not only a humanoid or an emotional robot but is a driving body which may interact with human beings and may be operated by itself or a user command.

Hereinafter, a detailed structure of the movable table 1 according to the embodiment of the present invention will be described with reference to FIGS. 2 to 5.

Figure 2:
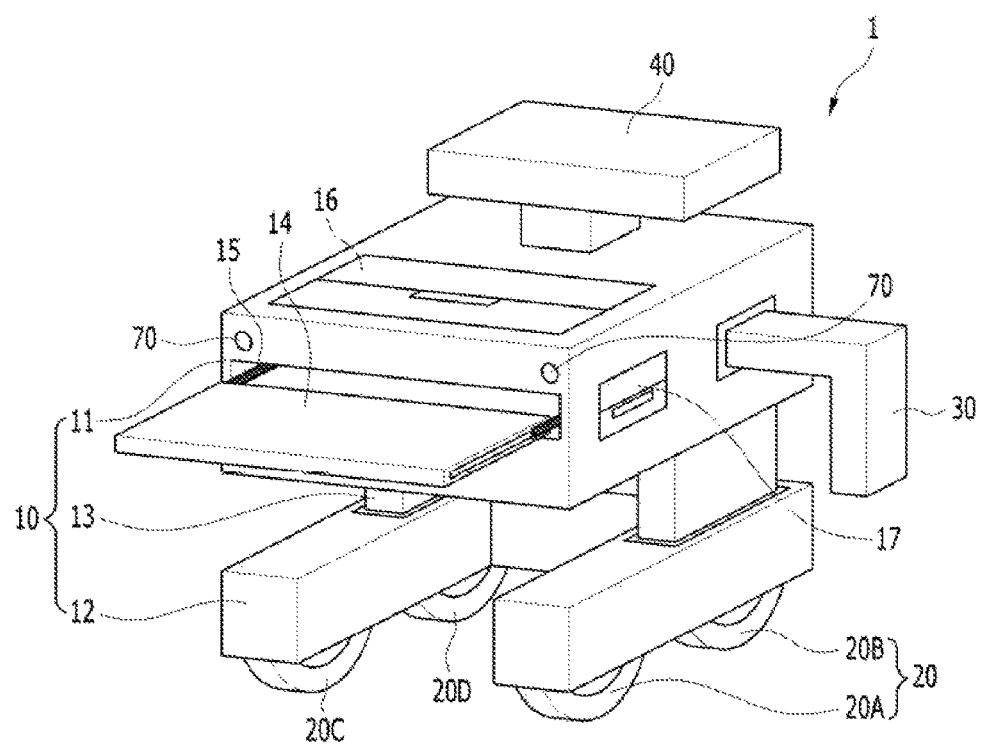
FIG. 2 is a perspective view illustrating a structure of the movable table according to the embodiment of the present invention.
Figure 3:
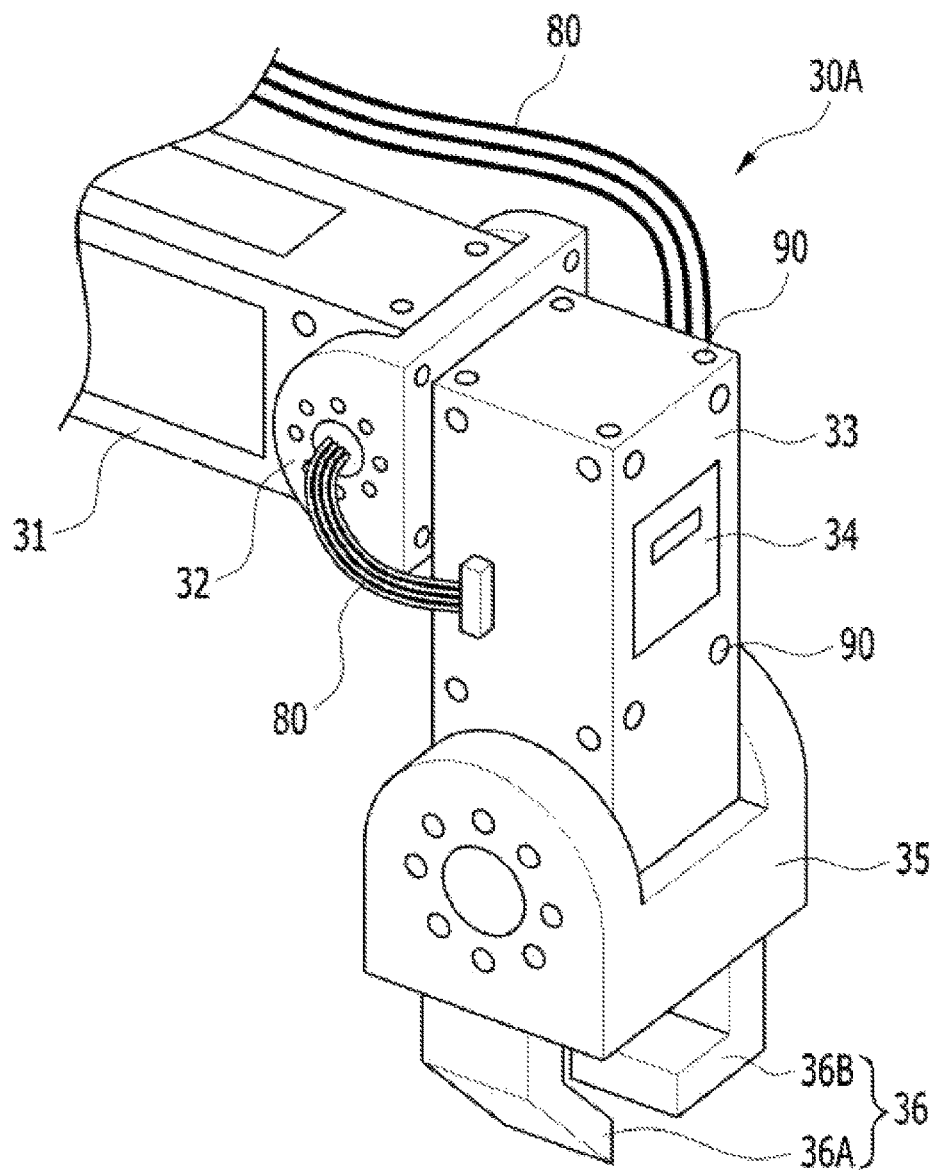
FIG. 3 is a view illustrating a structure of a motion part of the movable table of FIG. 2.
Figure 4:
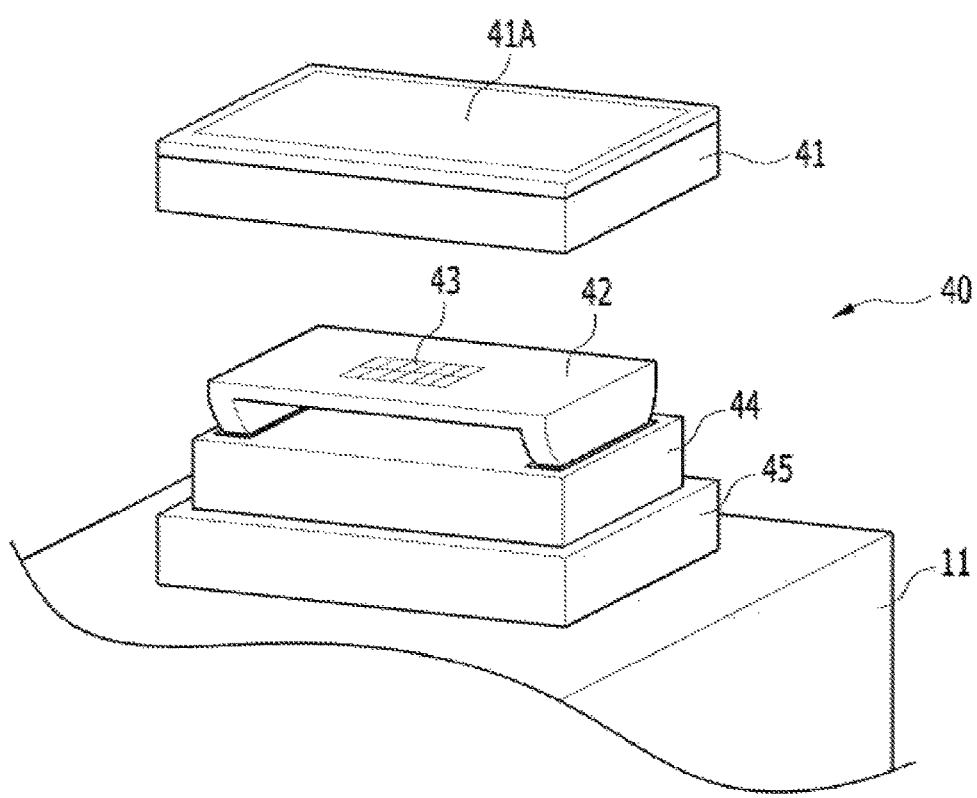
FIG. 4 is a view illustrating a structure of an image device part of the movable table of FIG. 2.
Figure 5:
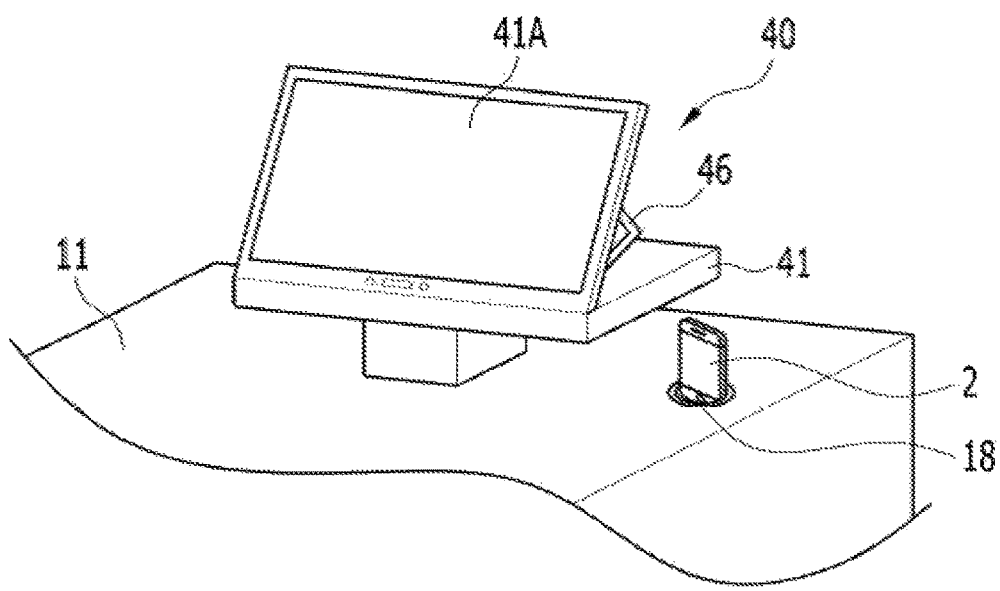
FIG. 5 is a partial view detailedly illustrating a main body part of the movable table of FIG. 2.

FIG. 2 is a perspective view illustrating a structure of the movable table according to the embodiment of the present invention, FIG. 3 is a view illustrating a structure of a motion part of the movable table of FIG. 2, FIG. 4 is a view illustrating a structure of the image device part of the movable table of FIG. 2, and FIG. 5 is a partial view detailedly illustrating the main body part of the movable table of FIG. 2.

The main body part 10 forms a body of the movable table 1 and includes a table 14 and receiving units 16 and 17. The main body part 10 may be formed in a single structure. Otherwise, the main body part 10 may be formed in a separated structure which includes an upper end portion 11, a lower end portion 12 and a middle connection portion 13 which connects the upper end portion 11 with the lower end portion 12. The middle connection portion 13 may be formed to be fixed to one of the upper end portion 11 and the lower end portion 12 and also to be relatively movable toward the other one. Alternatively, the middle connection portion 13 may be formed to be relatively movable toward the upper end portion 11 and the lower end portion 12. The upper end portion 11 forming the main body part 10 may have a table shape which is suitable to be used as a worktable, and the lower end portion 12 may have a "⊏" shape or a "11" shape which does not cause discomfort to a user's motion.

The table 14 may be slidably connected to one surface of the main body part 10 and may also have a height adjusting unit (not shown). As illustrated in FIG. 2, the table 14 may be installed to protrude from a front surface of the main body part 10. The table 14 may be accommodated in a hollow portion provided inside the main body part 10.

For the protrusion and the accommodation, a sliding portion 15 may be installed at the table 14. The sliding portion 15 drives forward and backward the table 14 through sliding in one stage or multi-stages. Meanwhile, the table 14 may be installed to be movable through its own structure or a hinge structure. Although not shown, the height adjusting unit has a well-known structure and allows the table 14 to have an appropriate height or angle to be used by the user. The sliding portion 15 or the height adjusting unit may be driven manually or automatically through a motor.

The receiving unit 17 provided at a side surface of the main body part 10 may be provided inside the main body part 10 in a drawer type. On the other hand, the receiving unit 16 provided at an upper end of the main body part 10 may be provided in a bellows structure or a lid-opening type structure.

Then, the moving part 20 is provided at a lower end of the main body part 10. The moving part 20 may include a plurality of wheels, e.g., four wheels 20A, 20B, 20C and 20D provided at four corners of the lower end portion 12 of the main body part 10. A fixing unit may be installed at one or all of the wheels 20A, 20B, 20C and 20D. The fixing unit which is not illustrated has a well-known structure and serves as a friction brake for restricting driving of the wheels 20A, 20B, 20C and 20D.

The moving part 20 may be automatically controlled and moved according to a user's command or a command of a program. For example, when a person is detected by a sensor part 70, the moving part 20 may be driven so that the movable table 1 is moved near to a place where the person is located. Alternatively, when it is a predetermined time or a certain situation according to a program, e.g., when a charge amount is a predetermined value or less, the movable table 1 may be moved toward an external power source.

The power supply part 30 is provided at one surface of the main body part 10 and has a power supply unit for charging or connection to power. As illustrated in FIG. 2, the power supply part 30 may be provided to have a structure which protrudes from the side surface of the main body part 10 or may be provided inside the main body part 10. The power supply part 30 may include a charging device and a circuit for the charging device or may vicariously or further include an external power connection device or a circuit for the external power connection device.

When the charging device is provided at the power supply part 30, a charging operation may be performed using a general cable. Meanwhile, when the movable table 1 is used at a general home, a device for arranging a cable, i.e., a device for accommodating the cable in the movable table 1 in a winding method or the like may be installed.

Meanwhile, a motion part 30A having a first driving unit may be provided at the side surface of the main body part 10. The first driving unit may include an actuator. The motion part 30A may be relatively moved or rotated with respect to the main body part 10 by the first driving unit or the actuator and may perform a predetermined motion.

Referring to FIG. 3, the motion part 30A may include the first driving unit having a first actuator module 31 and a second actuator module 33. Each of the first actuator module 31 and the second actuator module 33 may be formed in a type in which an actuator, a decelerator and a control circuit are provided in one housing.

A connection member 32 may be installed between the first actuator module 31 and the second actuator module 33. By the coupling between a plurality of actuator modules and the connection member 32, a manipulator structure which allows a multi-degree of freedom motion may be formed. To connect the first and second actuator modules 31 and 33 with the connection member 32 or to connect another external member, e.g., an industrial network module to the first and second actuator modules 31 and 33, a plurality of coupling structures 90 may be provided outside the second actuator module 33. Each of the coupling structures 90 may be, for example, a coupling groove which will form a female screw thread.

A receiving part 34 may be provided at the second actuator module 33, and a control module or the industrial network module may be accommodated at the receiving part 34.

A gripper 36 configured with one pair of gripper members 36A and 36B may be provided at the other end of the second actuator module 33, and a connection member 35 which provides an additional degree of freedom may be provided between the gripper 36 and the second actuator module 33. A certain operation or driving of a robot manipulator or a robot hand, e.g., gripping of an object or contacting the object may be allowed through the first and second actuator modules 31 and 33 and the gripper 36 by the user's command or the command of the program.

Referring to FIG. 2 again, the image device part 40 is provided at the upper end of the main body part 10 so that a position or an angle thereof is adjusted, and an image unit 41A is also provided. The image unit 41A may be a smart device, a monitor, a display device, an imaging device or a lighting device. For example, the image unit 41A may be the display device as illustrated in FIG. 4 or 5.

The image unit 41A may be put on a cradle 41. A supporter which supports the cradle 41 and has a second driving unit for adjusting a position or an angle of the cradle 41 may be provided between the cradle 41 and the main body part 10. That is, the image device part 40 may include the cradle 41 and the second driving unit and may drive the second driving unit according to the user's command or the command of the program and thus may enable the image unit 41A to have an appropriate position or orientation.

As illustrated in FIG. 4, the supporter may be configured with a series of pan-tilt structures 42 to 45 provided at the upper end portion 11 of the main body part 10. A coupling part 43 for preventing a slip of the cradle 41 and coupling with the cradle 41 may be installed at an upper end rotating part 42 which is in contact with the cradle 41. The upper end rotating part 42 may be rotatably coupled to a first support member 44, and the first support member 44 may be coupled to a second support member 45, and the second support member 45 may be coupled to the upper end portion 11 of the main body part 10.

The first support member 44 may be coupled to be movable upward and downward with respect to the second support member 45. Alternatively or at the same time, the second support member 45 may be coupled to be movable upward and downward with respect to the upper end portion 11.

Meanwhile, as illustrated in FIG. 5, the image unit 41A may be coupled to the cradle 41 through a hinge structure or other angle adjustable structure 46. Also, a connection part 18 for connection with a smart device 2 or for charging the smart device 2 may be provided at the main body part 10. When the smart device 2 is connected, the smart device 2 may serve as a separate output unit, and an output of the smart device 2 may be displayed through the image unit 41A.

The image unit 41A may be a beam projector, and an angle of the beam projector may be controlled manually. To this end, a motor may be used. The beam projector may project an image on a wall, a ceiling or a bottom surface therearound and thus may enable playing a game, displaying of a moving route, guiding of a person or the like.

The above-described moving part 20, the power supply part 30 and the image device part 40 may be formed as modules which are removably attached to the main body part 10. Since they are formed as removable modules, the moving part 20, the power supply part 30 and the image device part 40 may be selectively attached to the movable table 1 or may be selectively replaced according to a user's or developer's need. The motion part 30A may also be formed as a module which is removably attached to the main body part 10.

The control part 50 may be electrically connected to the moving part 20, the power supply part 30 or the image device part 40 and may control an operation thereof (referring to FIG. 1). The control part 50 may have a microprocessor, a memory, a power circuit and other circuit parts.

The communication part 60 may be connected to the smart device 2 outside the movable table 1 by wire or radio and may receive or transmit various control signals and command signals (referring to FIG. 1). The smart device 2 may be connected to a server 3 by wire or radio. Otherwise, the communication part 60 may be directly connected to the server 3 without the smart device 2 by wire or radio.

The sensor part 70 may be provided at the moving part 20, the power supply part 30 or the image device part 40. The sensor part 70 may detect an operation state of the movable table 1 or a environmental state therearound. For example, while the movable table 1 is moved, the sensor part 70 may detect a peripheral structure which may collide with the movable table 1 or a person or an animal which is located therearound. In addition, the sensor part 70 may detect a temperature or a sound therearound, and the movable table 1 may automatically perform programmed movement or motion based on a detected signal.

Meanwhile, although not illustrated, an LED may be installed at the image device part 40, and the LED may serve as a lighting part.

The movable table 1 according to the present invention may be recognized as a separate individual (robot) independently or by a selection of other driving device when being not used as a table. At this point, the image device part 40 may be used as a display which indicates a facial expression or a feeling of a robot.

According to the movable table 1 of the present invention, it is possible to interact with the user and to use functions of the smart device. Also, it is possible to have a table shape which is used as the worktable or a table shape which may use the image device, thereby ensuring user convenience and accessibility. Also, it is possible to be connected to the smart device or the image device to drive the smart device or the image device, and it is possible to be movable by itself or the user command and to provide the human-machine interface.

The movable table according to the present invention can have the table shape which is used as the worktable or the table shape which can use the image device, thereby ensuring user convenience and accessibility.

Also, the movable table can be connected to the smart device or the image device to drive the smart device or the image device and can be movable by itself or the user command, and the human-machine interface can be provided.

Also, the movable table can interact with the user and can use the functions of the smart device.

The effects of the present invention are not limited thereto, and it should be understood that the effects comprises all of effects inferred from the configuration of the present invention described in the detailed description or claims of the invention.

It will be understood that the foregoing description of the present invention is for illustrative purposes only, and that, for ordinary person in the art, it can make various substitutions, alternations and changes without any change in the technical spirit or the essential characteristics of the present invention. Therefore, the above-described embodiments are to illustrate, not to limit the scope of the claims. For example, a single element can be implemented in distributed elements, and in the same way, distributed elements can also be implemented in a single element.

Also, the scope of the present invention is represented by the claims to be described later, and the meaning of the claims, the scope and all such modifications as would be derived from the equivalent concepts are interpreted to be contained in the scope of the invention.

What is claimed is:

1. A movable table comprising:
   a main body part having a table and a receiving unit;
   a moving part provided at a lower end of the main body part;
   a power supply part provided at one surface of the main body part and having a power supply unit for charging or connection to power;
   an image device part provided at an upper end of the main body part so that a position or an angle thereof is adjusted and having an image unit,
   wherein one or more of the moving part, the power supply part and the image device part are formed as modules which are removably attached to the main body part; and
   a motion part comprising a first actuator module and a second actuator module, wherein the motion part is disposed at a side surface of the main body part,
   wherein the motion part is relatively moved or rotated with respect to the main body part by the first actuator module and the second actuator module and performs a predetermined motion.

2. The movable table of claim 1, further comprising a control part which is electrically connected to the moving part, the power supply part and the image device part to control an operation thereof.

3. The movable table of claim 1, wherein the table is slidably connected to one surface of the main body part and has a height adjusting unit.

4. The movable table of claim 1, wherein the receiving unit is provided inside the main body part in a drawer type.

5. The movable table of claim 1, wherein the moving part has a plurality of wheels having a fixing unit installed thereat.

6. The movable table of claim 1, further comprising a connection member configured to connect the first actuator module and the second actuator module.

7. The movable table of claim 1, wherein the image unit includes one or more of a smart device, a monitor, a display device, an imaging device and a lighting device.

8. The movable table of claim 1, wherein the image device part includes a cradle on which the image unit is put, and a supporter provided between the cradle and the main body part to support the cradle and having a second driving unit which adjusts a position or an angle of the cradle.

9. The movable table of claim 1, further comprising a sensor part which is provided at one or more of the main body part, the power supply part and the image device part and detects an operation state of the movable table or a environmental state therearound.

* * * * *